(12) United States Patent
Guzzon et al.

(10) Patent No.: US 12,365,952 B2
(45) Date of Patent: Jul. 22, 2025

(54) PROCESS AND APPARATUS FOR THE GRANULATION OF SLAG DERIVING FROM IRON AND STEEL PRODUCTION

(71) Applicant: Tenova S.p.A., Milan (IT)

(72) Inventors: Marta Guzzon, Pero (IT); Enrico Malfa, Zanica (IT); Lucio Bozzetti, Arona (IT); Mattia Bissoli, Bovolone (IT); Fabio Praolini, Cantello (IT)

(*) Notice: Subject to any disclaimer, the term of this patent is extended or adjusted under 35 U.S.C. 154(b) by 380 days.

(21) Appl. No.: 17/759,309

(22) PCT Filed: Feb. 4, 2021

(86) PCT No.: PCT/IB2021/050915
§ 371 (c)(1),
(2) Date: Jul. 22, 2022

(87) PCT Pub. No.: WO2021/156789
PCT Pub. Date: Aug. 12, 2021

(65) Prior Publication Data
US 2023/0058888 A1    Feb. 23, 2023

(30) Foreign Application Priority Data
Feb. 7, 2020    (IT) .................. 102020000002449

(51) Int. Cl.
*C21B 3/08*    (2006.01)

(52) U.S. Cl.
CPC .......... *C21B 3/08* (2013.01); *C21B 2400/026* (2018.08); *C21B 2400/062* (2018.08)

(58) Field of Classification Search
None
See application file for complete search history.

(56) References Cited

U.S. PATENT DOCUMENTS

| 4,277,273 A | 7/1981 | Legille |
| 6,349,548 B1 | 2/2002 | Arana |
| 2020/0231498 A1* | 7/2020 | De Coninck ............. C22B 7/04 |

FOREIGN PATENT DOCUMENTS

| CN | 100392110 | 6/2008 |
| CN | 201778033 | 3/2011 |
| JP | S6158845 | 3/1986 |
| JP | 2003104761 | 4/2003 |
| JP | 2017081814 | 5/2017 |

OTHER PUBLICATIONS

JPS6158845A EPO Machine Translation Retrieved Oct. 17, 2024. (Year: 2024).*
JP2003104761A EPO Machine Translation Performed Dec. 10, 2024. (Year: 2024).*

* cited by examiner

*Primary Examiner* — Lisa L Herring
(74) *Attorney, Agent, or Firm* — Themis Law; Franco A. Serafini

(57) ABSTRACT

A process for the granulation of slag deriving from iron and steel production, in particular a process for the granulation of slag in air, and an apparatus configured to perform this process, provide for the production of granulates with different characteristics depending on the intended use, thus making this process and apparatus particularly versatile. More specifically, a process according to the present invention includes a step of controlling and modifying the time and/or the cooling rate of the slag granules so as to obtain slag granules having desired morphological features.

11 Claims, 8 Drawing Sheets

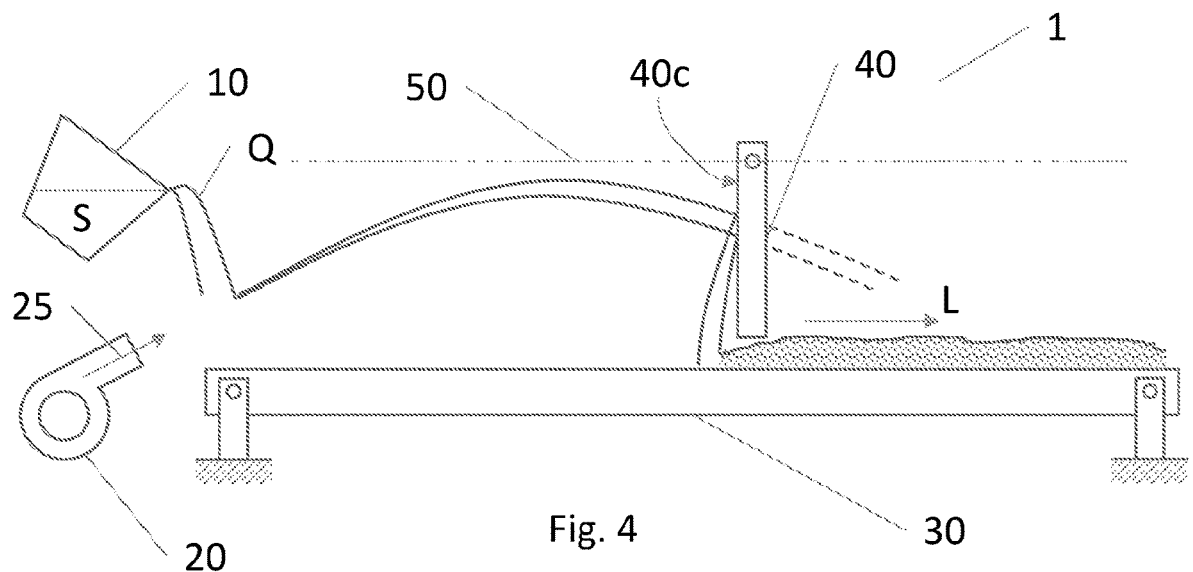
Fig. 4
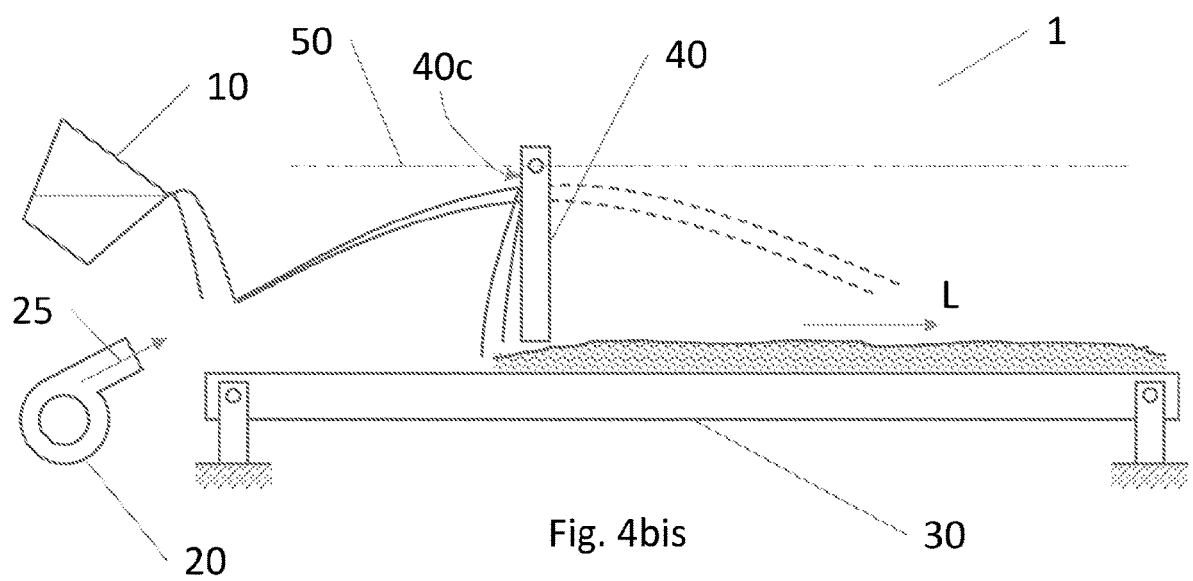
Fig. 4bis

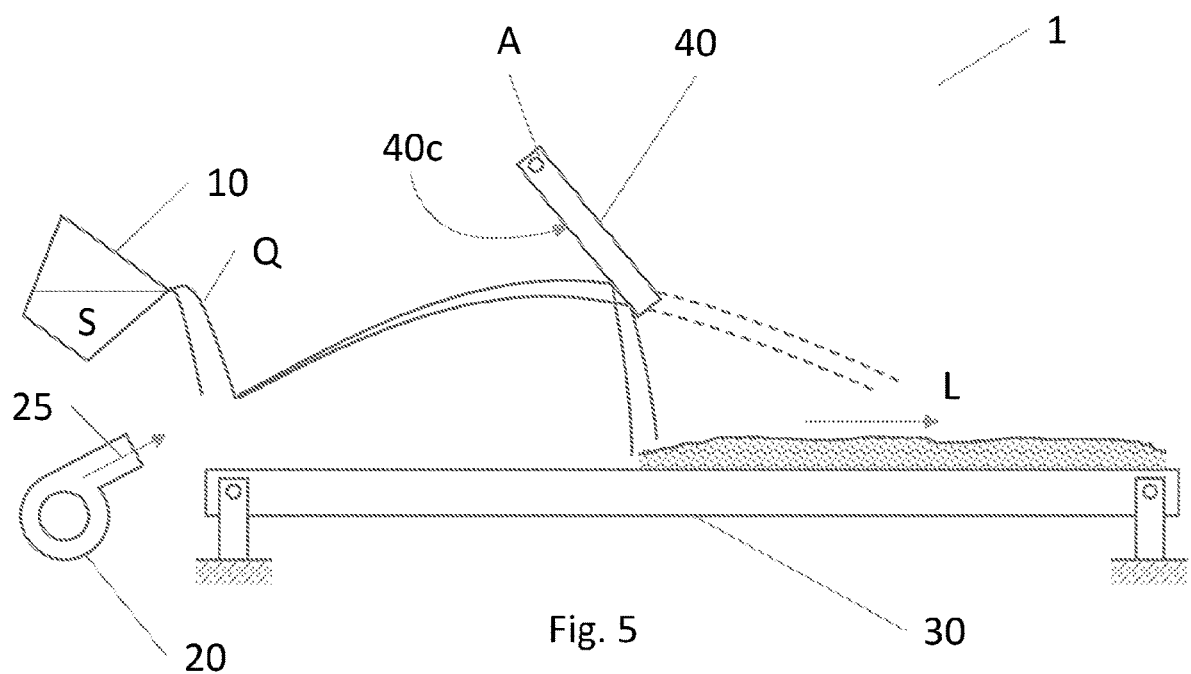
Fig. 5
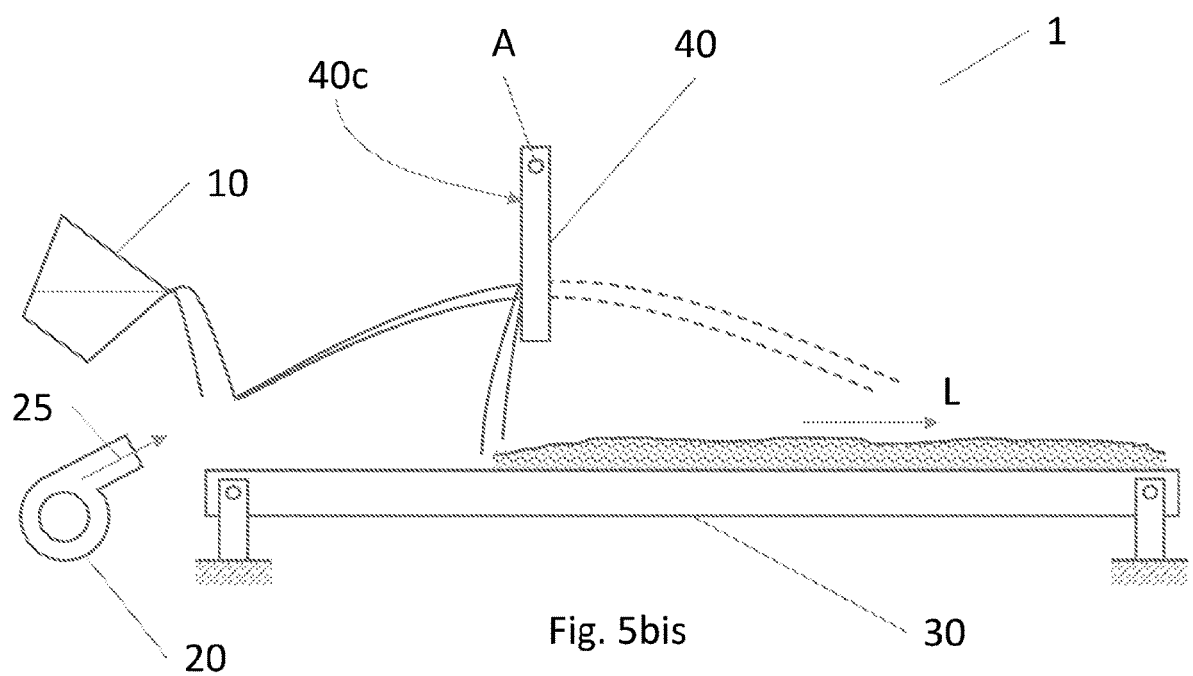
Fig. 5bis

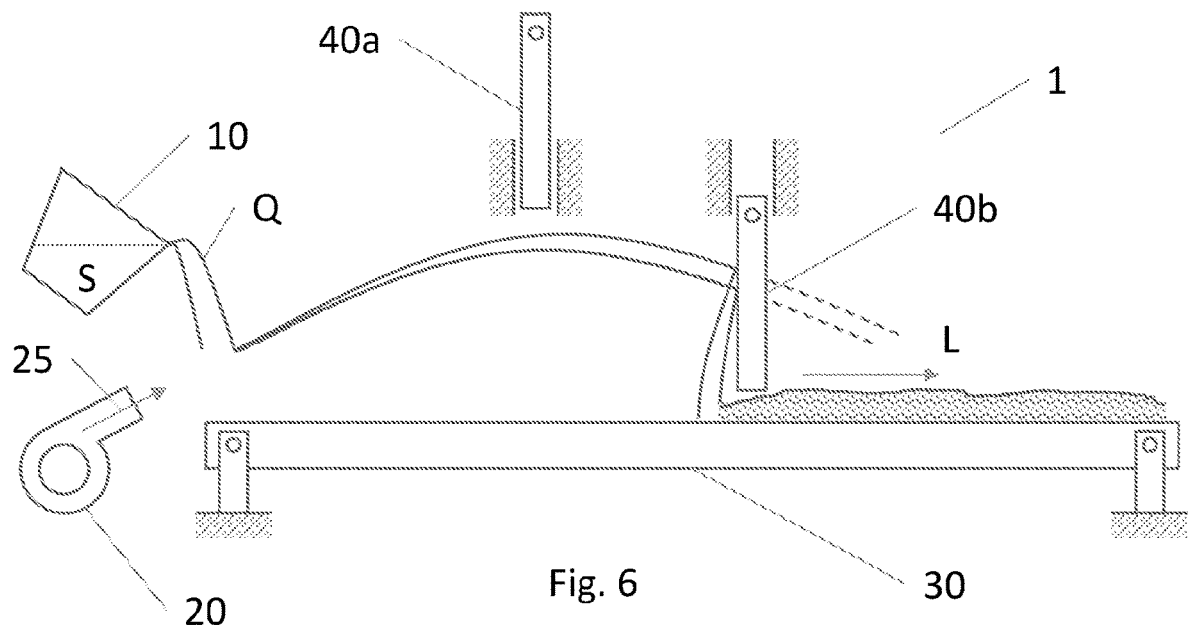
Fig. 6
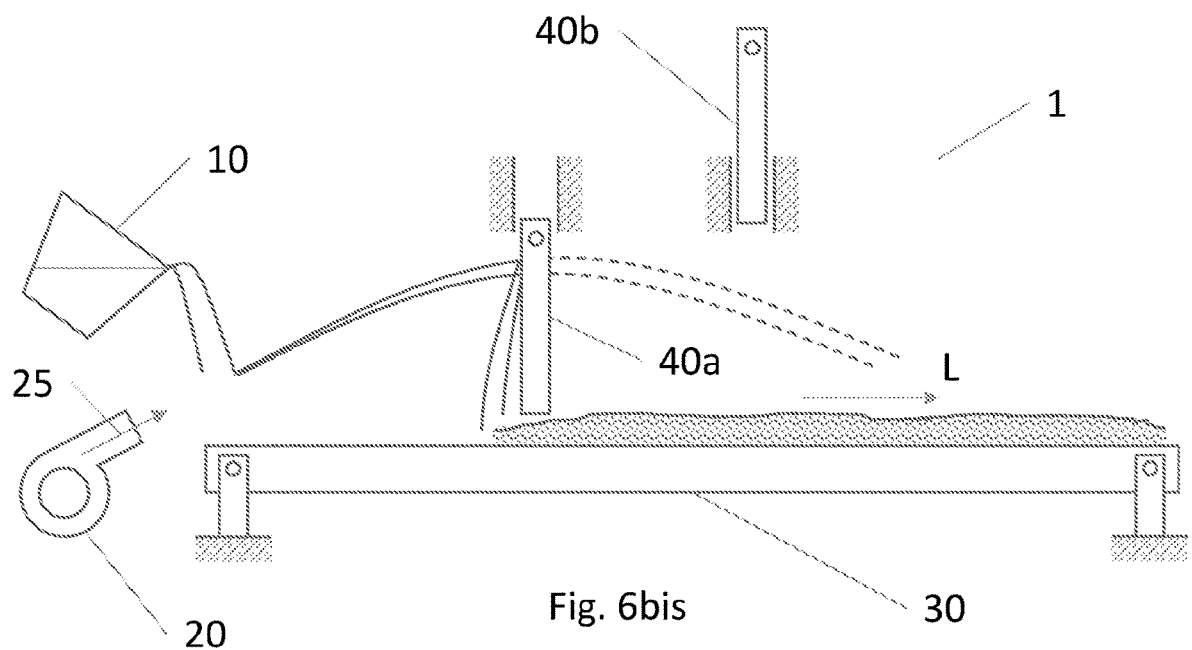
Fig. 6bis

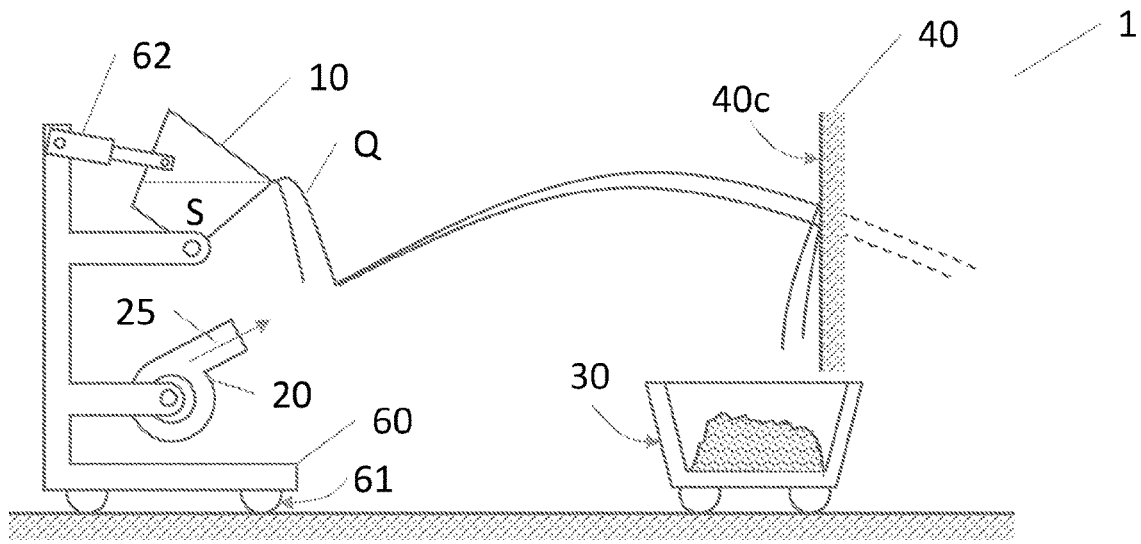
Fig. 7
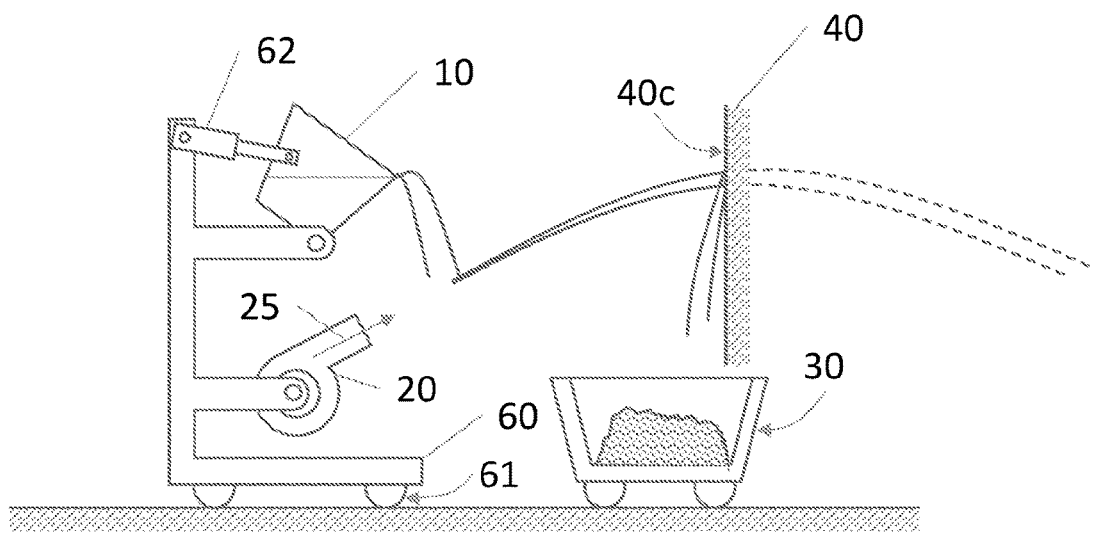
Fig. 7bis

PROCESS AND APPARATUS FOR THE GRANULATION OF SLAG DERIVING FROM IRON AND STEEL PRODUCTION

FIELD OF THE INVENTION

The present invention relates to a process for the granulation of slag deriving from iron and steel production, in particular a process for the dry granulation of slag, in addition to an apparatus suitable for implementing this process.

In particular, the process and apparatus according to the present invention allow the production of granulates with different characteristics depending on the intended use, thus proving to be particularly versatile.

STATE OF THE ART

As is known, iron and steel processes for the production of cast iron and steel generate significant quantities of slag whose composition is closely related to the characteristics of the raw materials and additive elements used in the process.

Depending on whether the slag derives from iron and steel processes in blast furnaces, in oxygen converters, in electric arc furnaces, in ladle refining furnaces, and so forth, the slag will have different chemical and physical characteristics. The slag is classified, based on the regulations currently in force such as Regulation (EC) Nr. 1907/2006 relating to the registration, evaluation, authorization and restriction of chemical substances (REACH), according to these chemical and physical characteristics. In some cases, some types of slag are recognized as by-products, however they are much more often considered as being waste to be disposed of, and therefore represent a serious problem from both an environmental and logistical point of view.

The slag produced by ladle refining furnaces (SMS), for example, after cooling, undergoes a transformation of the crystal lattice which leads to the formation of a fine and dusty material, which greatly complicates environmental and logistical management.

Numerous systems and processes have been proposed for solving the problems mentioned, with the aim of simplifying the management of slag in an environmentally safe and sustainable way from an economic point of view, transforming the slag into a product that can be reused in other fields of application such as—for example—civil application, where slag can be used as an inert material in the construction of road surfaces.

One of the techniques used is granulation with water or dry granulation.

Dry granulation, where possible, is preferable to that with water as it avoids the consumption of water and reduces the need for treatment.

In dry granulation, an example of which is provided in U.S. Pat. No. 4,218,201, a flow of blast-furnace slag in liquid state is struck by an air jet that breaks the flow of liquid slag into a multiplicity of drops that solidify almost instantly. The granulate obtained from the solidification of the molten slag is subsequently collected and is then easily transported without further treatment.

This method however has various drawbacks, and in particular is anything but versatile, not allowing granulated slag having different physical characteristics to be obtained.

As, on the contrary, depending on the final uses of the granulated slag, the required characteristics are different (when the slag is used, for example, as an inert product in the civil field, it is preferable that the morphological structure be predominantly amorphous, i.e. vitreous, whereas in the case of other uses, for example when used as a binder, the granulate must have a predominantly crystalline structure, possibly after grinding), the need is felt in the field for having a flexible plant, which allows a flexible granulation process to be implemented so as to be able to produce granulates with different characteristics depending on the intended use.

SUMMARY OF THE INVENTION

In the light of the above, the undertaking of the present invention is to provide a dry granulation process of slag generated by iron and steel processes which is particularly flexible so as to be able to obtain granulates with different physical characteristics, allowing these granulates to be destined for different end-uses.

Within this undertaking, the objective of the present invention is also to provide an apparatus for the dry granulation of slag generated by iron and steel processes capable of implementing this process.

Within this undertaking, the objective of the present invention is to provide a process and an apparatus that allow controlled dry granulations to be effected, so as to be able to vary the cooling rate of the slag and thus obtain physically different granular structures.

The above-mentioned undertaking, in addition to the above-mentioned objectives and others which will appear more evident further on, are achieved by a dry granulation process of molten slag, in particular molten slag generated by iron and steel processes, according to the enclosed claim 1, and also an apparatus for the dry granulation of molten slag, in particular of molten slag generated by iron and steel processes, according to claim 7.

Further characteristics of the preferred embodiments of the granulation process and granulation apparatus of slag according to the present invention described in the present patent application are the subject of the dependent claims.

LIST OF FIGURES

Further characteristics and advantages will become more evident from the description of some preferred but non-exclusive embodiments of the apparatus according to the present invention capable of implementing the process which is also the object of the present invention, illustrated for indicative and non-limiting purposes with the aid of the attached drawings in which:

FIG. 1 schematically shows a diagram which indicates the solid phases that can be obtained according to the cooling rate of the slag (in a Cartesian plane in which the time is indicated on the abscissa and the temperature is indicated on the ordinate);

FIGS. 2 and 3 respectively indicate a diagram of the trajectory, and therefore of the permanence in air of the slag particles in a dry granulation process of the known type and, in FIG. 3, the relative trend of the cooling curves on the Cartesian graph of FIG. 1;

FIGS. 4 and 4 bis show simplified schematic views of a first embodiment of the apparatus according to the present invention, respectively in a first (FIG. 4) and in a second (FIG. 4bis) operating mode;

FIGS. 5 and 5 bis show simplified schematic views of a second embodiment of the apparatus according to the present invention, respectively in a first (FIG. 5) and in a second (FIG. 5 bis) operating mode;

FIGS. 6 and 6 bis show simplified schematic views of a third embodiment of the apparatus according to the present invention, respectively in a first (FIG. 6) and in a second (FIG. 6 bis) operating mode;

FIGS. 7 and 7 bis show simplified schematic views of a fourth embodiment of the apparatus according to the present invention, respectively in a first (FIG. 7) and in a second (FIG. 7 bis) operating mode;

DETAILED DESCRIPTION OF THE INVENTION

Figure 1:
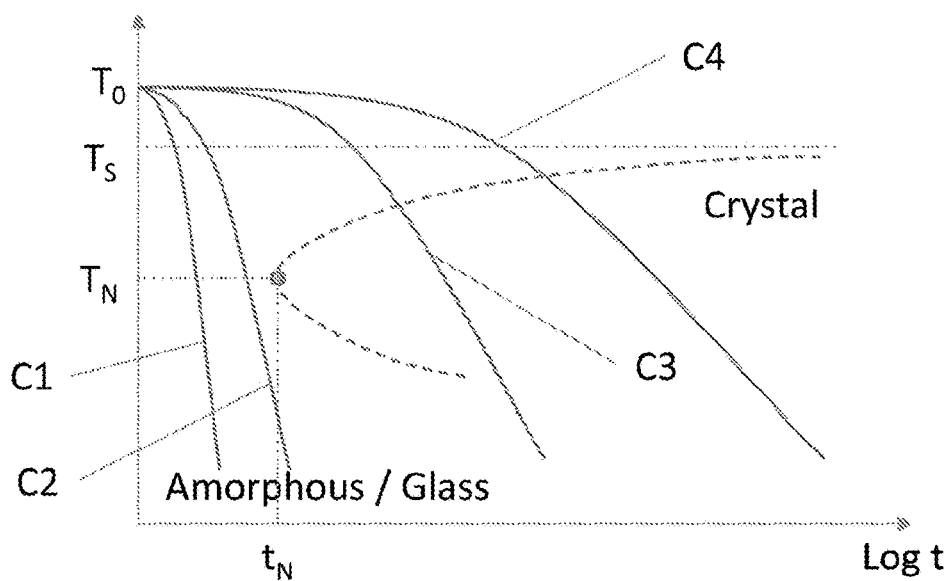

With particular reference to the attached figures, according to a first preferred embodiment of the present invention, the apparatus 1 for the dry granulation of molten slag S, in particular molten slag generated by iron and steel processes, comprises at least one container 10 containing the molten slag in the liquid state S to be treated, means for generating a flow of gas 20 for the generation of a flow 25 of gas (or mixture of gases, for example air under ambient conditions) suitable for enveloping the flow Q of slag S when this is spilled from said container 10 before said flow Q comes into contact with other parts of the apparatus, breaking the flow Q of slag S into small drops Q" and pushing these drops Q" of said flow Q of slag S along a trajectory having at least one component along the longitudinal direction L away from said means for generating an air flow 20 and from said container 10.

It is extremely important in the process according to the present invention that the flow of slag spilled from the container be struck by the jet of air when it is still in flight, before it comes into contact with other parts or surfaces of the apparatus, such as ducts, slides or, as is known to be used in the treatment of blast-furnace slag and electric-arc-furnace slag (EAF), with granulation rollers. Roller granulation cannot in fact be used in the treatment of slag from LF (Ladle Furnaces) or secondary metallurgy, which on the contrary is the field of application of the present invention. Whereas blast-furnace slag and electric-arc-furnace (EAF) slag are in fact essentially free of suspended liquid metal parts, LF/secondary metallurgy slag that is spilled or tapped from the container or ladle is very often mixed with a far from negligible part of liquid metal (liquid steel), which, when it falls onto the granulator roller, damages it very rapidly, unacceptably shortening the useful life of the roller and making the process generally unusable.

The container 10 can, by way of example, be a ladle (i.e. a metal carpentry vessel internally lined with refractory material) or a cauldron (cast iron vessel with or without internal refractory).

The apparatus 1 also comprises means 30 for collecting and transporting the cooled slag granules and means for deflecting and/or stopping 40 said flow Q of slag S in order to obtain slag granules having desired morphological characteristics.

The apparatus 1 for the dry granulation of slag S object of the present invention is suitable for implementing a dry granulation process also object of the present invention, which is characterized in that it comprises at least one step consisting in controlling and modifying the time and/or cooling rate of the drops/granules Q" of the flow Q of slag S in order to obtain slag granules having the desired morphological characteristics, with the consequent advantages illustrated above.

The step for controlling and modifying the time and/or the cooling rate of said drops/granules of said flow Q of slag S preferably comprises at least one step consisting in controlling and modifying the residence time in flight of said droplets/granules driven by said jet of gas 25 which directly strikes the flow Q spilled from said container 10, deflecting and/or stopping its movement, by means of deflection and/or stopping means 40 of said flow Q.

Said deflection and/or stopping means 40 of said flow in drops/granules Q" of slag S are configured for intercepting said flow Q and causing the precipitation of said slag granules S in said means 30 for collecting and transporting the cooled slag granules.

In order to control and modify the residence time in flight of the drops/granules Q" of the flow Q of slag S, the deflection and/or stopping means of the flow of slag can advantageously comprise at least a plate or a panel 40 positioned in a point of the component along the longitudinal direction L of the trajectory of the flow in drops/granules Q" of slag S pushed by the gas jet 25. Said plate or panel 40 can preferably be moved along said longitudinal direction L so as to be able to vary the residence time in flight of the granules of the flow in flight Q by positioning said plate or panel 40 in different points of the flight path of said drops/granules Q" which will consequently be precipitated into the collection means 30 after a cooling period in flight which can be controlled and varied by the operator according to where he positions the plate or panel 40.

Non-limiting examples of the collection and transporting means 30 can be systems such as vibrating or oscillating conveyors, such as vibro-extractors, or those with plates. Alternatively, the collection and transporting means 30 can consist for example of a rotating and tilted drum which transports the granulate by gravity. In other solutions, the collection and transporting means 30, rather than being of the continuous type such as those mentioned, can be of the "batch" type, such as for example collection bins which can be moved by forklifts or other systems.

Figure 2:
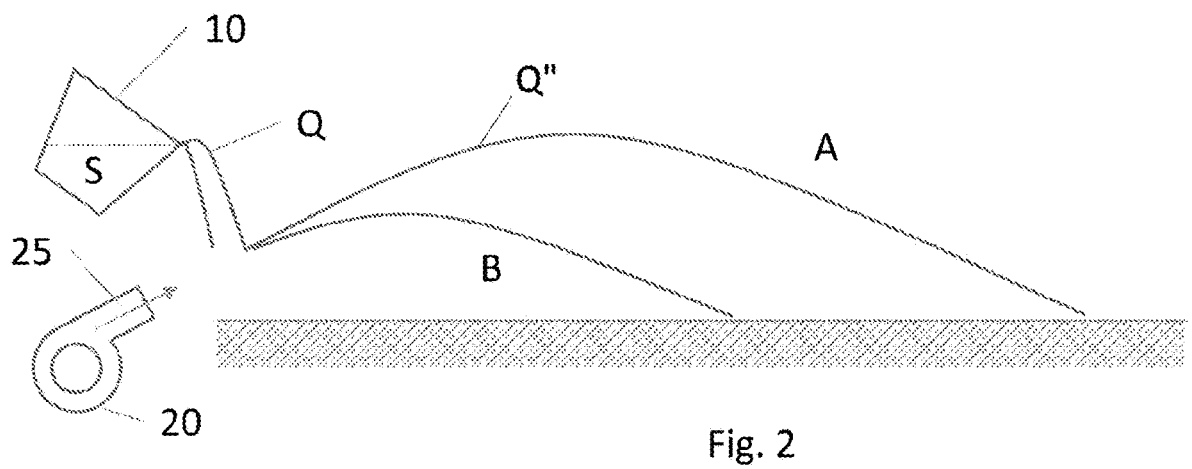

This type of apparatus capable of effecting the dry granulation of slag is shown in FIG. 2, where possible trajectories A and B are schematically illustrated, followed by the drops of spilled molten slag which are pushed by the flow of gas 25.

Figure 3:
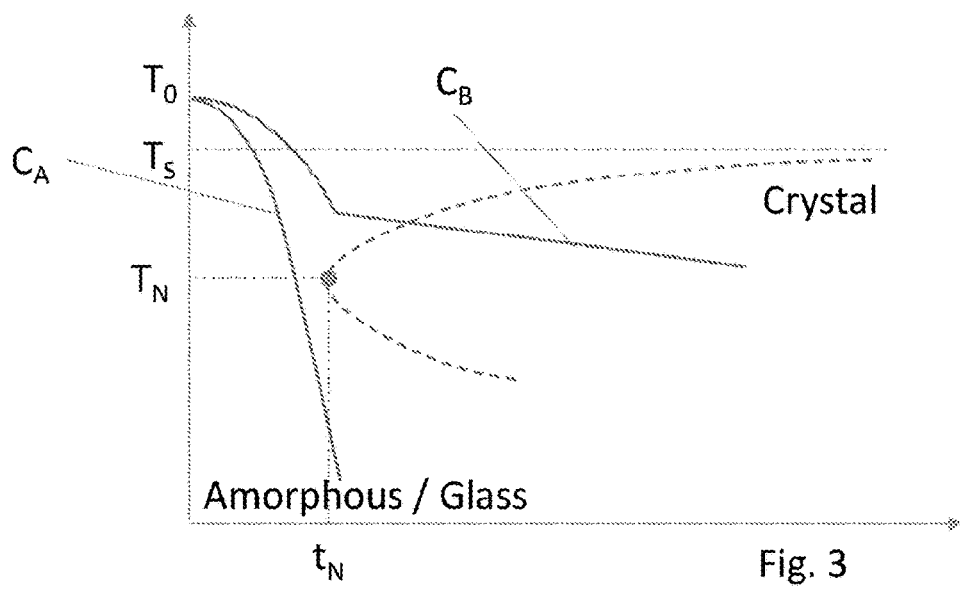

The graph of FIG. 3 shows the cooling curves $C_A$ and $C_B$ respectively of the particles following the trajectory A and those following the trajectory B, all starting from the initial temperature $T_0$ which can be assumed as being equal to or close to the extraction value of the slag S from the furnace (around 1,500° C.-1,600° C.).

As can be seen from the graph in FIG. 1, if the cooling rate is sufficiently high, as in the case of the curves $C_1$ and $C_2$, the complete formation of an amorphous or vitreous phase is obtained, i.e. where a crystal lattice cannot be identified. If, on the other hand, the cooling takes place sufficiently slowly, as in the case of the curves $C_3$ and $C_4$, the physical structure obtained for the solid granules is largely a crystal lattice.

For this reason, as already mentioned, it is possible to obtain different properties of the slag granules, in particular different physical properties relating to the different structures of the granules, by controlling the cooling rate of the granules themselves, adjusting it so as to have low cooling rates if crystalline granules are to be obtained, or high cooling rates if vitreous granules are desired.

Again with reference to the diagram of FIG. 1, considering the vertex of the dashed curve that separates the amorphous phase from the crystalline phase, a pair of values of time $t_N$ and temperature $T_N$ can be identified, which can be considered as discriminating the result that will be obtained at the structure level of the solid granule: if the temperature $T_N$ is reached in a time less than $t_N$, then the structure of the solid will be predominantly amorphous; if on the other hand the temperature $T_N$ is reached in a time higher than $t_N$, then the structure of the solid will be at least partly crystalline.

Below this critical rate (which can be defined as the ratio $(T_S-T_N)/t_N$, wherein $T_S$ is the solidification temperature of the slag), lower rates will lead to the generation of solid granules having a greater crystalline part with respect to the amorphous part (cf. curve $C_4$ with respect to curve $C_3$).

The apparatus according to the present invention allows a process to be implemented wherein the cooling rate of the slag is controlled and can be varied, consequently allowing the physical structure of the solid granule obtained to be controlled.

For this purpose, the apparatus 1 according to the present invention is characterized in that it further comprises deflection and/or stopping means 40 of said flow in drops/granules Q" of slag S configured so as to intercept said flow Q and cause the precipitation of said slag granules S in said collection and transporting system 30 for collecting and transporting the cooled slag granules.

Said apparatus therefore implements a process, also object of the present invention, wherein the time and/or the cooling rate of said drops/granules Q" of said flow Q of slag S can be controlled and modified in order to obtain slag granules having the desired morphological characteristics.

In this process, a flow Q of slag S with a controlled temperature and flow-rate is struck directly, i.e. during its spillage from the container 10, before it comes into contact with other parts of the apparatus, by a jet of gas 25 at a high speed which crushes the slag flow into small droplets.

The speed of the jet 25 of gas or gas mixture, advantageously air for example, is normally around 50-150 m/s, depending on the size of the granules to be produced (the higher the speed, the smaller the slag granules produced will be).

Furthermore, the mass flow-rate of gas (advantageously air) is regulated so as to have a pulse which is such as to break the slag flow and project the drops thus formed along parabolic trajectories away from the interaction point between slag flow and gas jet; in particular, the ratio between the flow-rates of the gas jet 25 and the slag flow can preferably range from 0.5 to 2 (kg/s of gas over kg/s of slag).

These drops rapidly solidify along their path in flight, due to the convective and radiative heat exchange with the surrounding environment, extremely effective given the large exposed surface and the high temperature difference, and then reach the ground or the collection structure, as schematically represented in FIG. 2.

Depending on the process conditions, the slag particles can follow, for example, a similar trajectory to that indicated with A in FIG. 2, which corresponds to a cooling curve such as that indicated by $C_A$ in FIG. 3: the particles that travel along this trajectory have a flight time which is such as to guarantee a rapid and complete cooling of the solid, so as to maintain almost all of the amorphous structure in the granule formed.

In other process conditions, for example with a jet of air 25 having a lower speed, the trajectory followed by the slag particles could be that indicated with B in FIG. 2, therefore a much shorter path in the air with respect to case A previously considered: in this case, the cooling curve follows a different trend, represented by the curve $C_B$ in FIG. 3. After cooling in air substantially similar to that of case A, the solidified slag particle reaches the ground when it is still at a high temperature.

Once it reaches the ground, there is no cooling by convective heat exchange with the surrounding environment; the temperature will therefore tend to decrease with a much lower rate than that of the granule in flight. This situation is represented by the curve $C_B$, which clearly has a discontinuity starting from the instant in which the granule has reached the ground or collection structure: the granule that is travelling along a type-B trajectory will consequently have a mainly crystalline structure, due to the low cooling rate to which it is already subjected at high temperatures (above the temperature $T_N$ defined above).

Returning to the apparatus according to the present invention capable of implementing the process also object of the present invention, this will comprise means 40 for deflecting and/or stopping the flow in drops/granules Q" of slag S movable along said longitudinal direction L and blockable in a desired position.

The granules propelled by the gas jet 25 therefore travel along a parabolic section in the air, cooling rapidly, until they reach said deflection and/or stopping means 40 which interrupt or in any case divert their flight; following the impact against the element 40, the granules precipitate downwards, creating a layer having a certain thickness on the transporting system 30, which conveys them towards subsequent processing (this thickness is substantially correlated to the speed of the transporting system and to the flow-rate of the granules generated, in turn correlated to the flow-rate of the slag spilled from the container 10).

Again, and with reference to the embodiment shown in FIGS. 4, 4bis, said deflection and/or stopping means 40 of said flow in drops/granules Q" of slag S advantageously comprise at least one plate or panel 40 comprising at least one impact surface 40c configured for deflecting and/or stopping the flow in drops/granules Q" of slag S and cause the precipitation of said slag granules S in a predetermined area of said collection and transporting means 30.

In a preferred embodiment of the present invention, shown by way of non-limiting example in FIGS. 5, 5bis, said at least one plate or panel 40 can be rotated around a substantially horizontal axis A so as to be able to modify the inclination of the impact surface 40c of said plate or panel 40 with respect to the vertical direction and can be blocked in a desired position so as to be able to modify the trajectory and falling point of the granules of said flow Q deviated from said impact surface 40c within a predetermined area of the collection and transporting system 30.

According to a further variant of the apparatus according to the present invention, illustrated by way of non-limiting example in the attached FIGS. 6 and 6bis, a plurality of said deflection and/or stopping means 40 of said flow in drops/granules Q" of slag S can be provided, positioned along said longitudinal direction L, each of which can be moved, independently of each other, between a first non-operating position in which they do not intercept the flow in drops/granules Q" of said slag S and an operating position in which they intercept the flow in drops/granules Q" of said slag S.

Said plurality of deflection and/or stopping means 40 of said flow can therefore advantageously comprise at least two plates or panels 40a, 40b each of said plates or panels 40a, 40b being movable, independently of each other, between a first position which is not operational (for example the right panel 40b in FIG. 6 and the left panel 40a in FIG. 6 bis) in which it does not intercept the flow in drops/granules Q" of said slag S, and an operating position (for example the first panel 40a on the left in FIG. 6 and the second panel 40b on the right in FIG. 6 bis) in which they intercept the flow in drops/granules Q" of said slag S.

In a further preferred embodiment of the present invention, illustrated by way of non-limiting example in the attached FIGS. 7 and 7 bis, the container 10 and the means 20 for generating a gas flow 25 are mounted on a supporting structure 60, said structure being equipped with means 61 which allow it to move at least along a direction parallel to that of the gas flow 25. The container 10 can be advantageously overturned in a controlled manner by acting on actuators 62 of the known type (for example hydraulic actuators or other types of actuator, electric motors, etc.). In this embodiment, the deflection and/or stopping means 40 consist of a wall which has an impact surface 40c towards which the flow Q of drops/granules Q" of said slag S is projected. After the impact with the surface 40c, these granules precipitate downwards and are collected in the collection and transporting means 30, represented by way of example in this case by a collection bin that can be subsequently moved. In this embodiment, thanks to the movement means 61, it is therefore possible to vary the distance between the supporting structure 60 and the wall 40, consequently varying the flight time in the air of the drops/granules Q" of slag. The wall 40 can be fixed or also movable; furthermore, it can advantageously be made of metallic material with a high resistance to shock and wear, and equipped with cooling systems.

Figure 11:
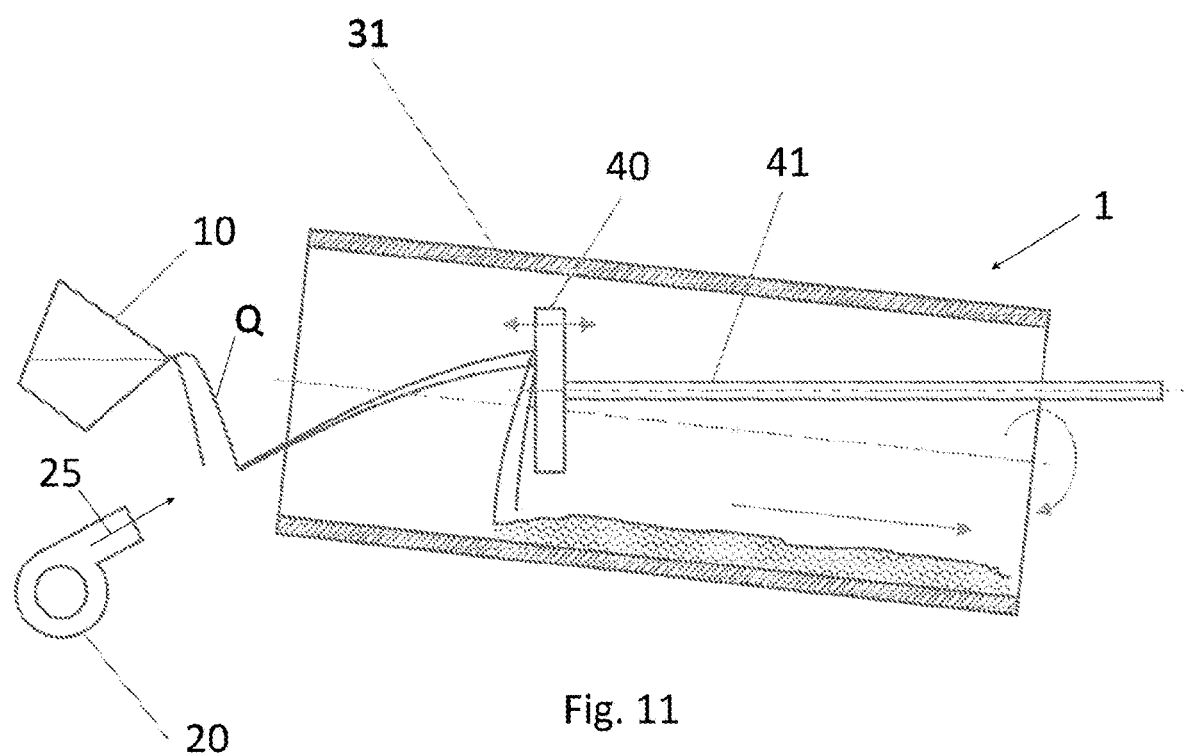
FIG. 11 illustrates a simplified schematic view of a sixth embodiment of the apparatus according to the present invention.

In a further embodiment variant schematically represented in FIG. 11, the apparatus 1 for the dry granulation of slag S according to the present invention can advantageously comprise a collection and transporting system 30 in turn comprising a drum 31 rotating around its own longitudinal axis so as to transport the granulate, moving it away from the granulation area of the slag underlying said plate or panel 40, the latter being supported and moved along the longitudinal direction L by a movable supporting element 41 suitable for translating inside said drum 31 with respect to the latter.

Further preferred aspects of the apparatus according to the present invention will now be described by way of non-limiting example of the apparatus and process according to the present invention as the implementation of some additional optional elements can be advantageous for increasing the effectiveness and efficiency of the process implemented by this apparatus.

Figure 8:
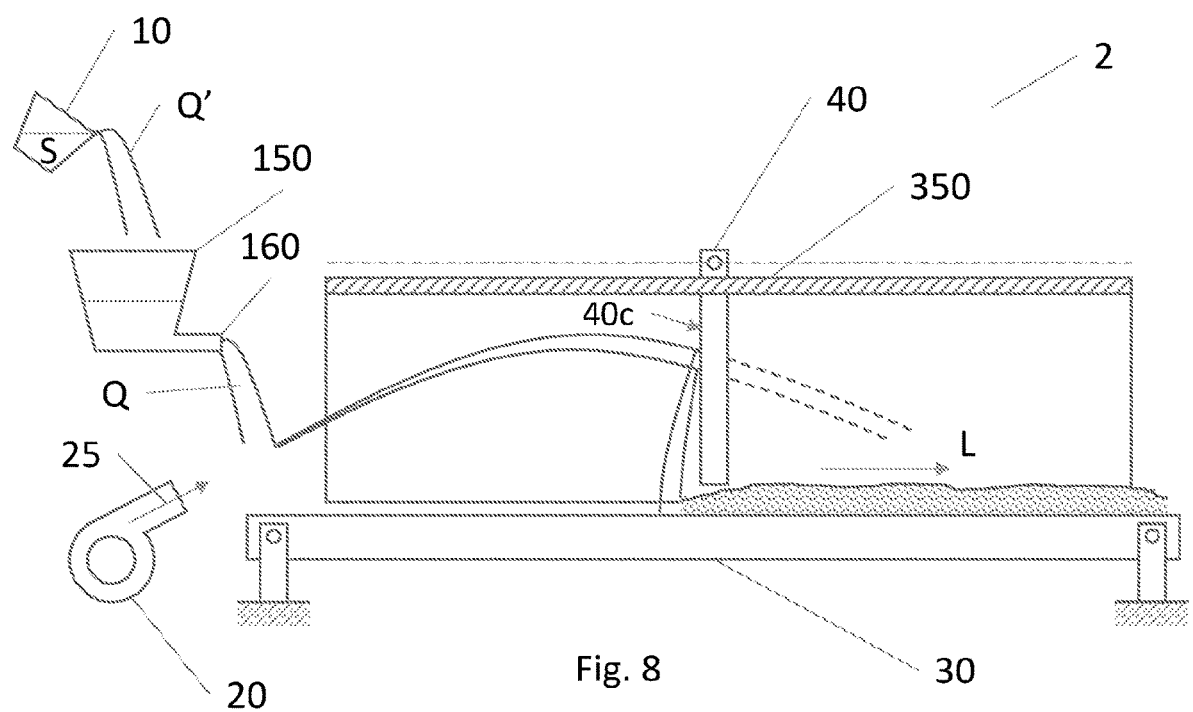
FIG. 8 shows a simplified schematic view of a fifth embodiment of the apparatus according to the present invention.

Reference is made to the embodiment of FIG. 8, where it can be noted that the container 10 (for example, a cauldron or a ladle) containing the slag to be treated pours a first stream Q' of slag S into an additional granulation container 150.

This granulation container 150 can be internally lined with refractory material and heated, so as to effectively control the temperature of the slag to be treated. The granulation container 150 is in turn suitable for the controlled discharging of a second flow Q of slag S destined for being struck by the jet of air (or gas) 25: it can be configured for example as a "tundish" (tundish/ingot mould) which remains fixed and is equipped with an adjustable duct 160 for discharging the slag, or it can be composed, for example, of a ladle lined with refractory material and equipped with a casting spout, mounted on an overturning system suitable for controlling the flow-rate of the slag leaving the container itself.

In any case, the granulation container 150, in addition to ensuring a constant temperature and consequently a constant viscosity of the slag contained therein, substantially allows the processes upstream in which the slag is generated (batch processes in fact), to be decoupled from the granulation process, which can consequently be operated in an almost continuous and independent manner, with a considerable saving on the plant design of various auxiliary pieces of equipment. In particular, it is therefore possible to rapidly transfer (in a time in the order of a few tens of seconds) the liquid slag S from the transporting container 10 to the granulation container 150, so as to rapidly make the transporting container 10 available again for subsequent process steps, and conveniently prolong the granulation step of the slag up to a maximum time substantially equal to that with which the slag is produced cyclically (for example the "tap-to-tap" time of the electric furnace, or the pouring time from the ladle into the continuous casting machine, or the time of the tapping cycle of the slag from the high furnace).

Again with reference to the diagram of FIG. 8, the flow Q of slag leaving the granulation container 150 can usefully acquire an enlarged shape, for example on the basis of the conformation of the adjustable duct 160, or on the basis of the same shape of the granulation container 150, if it is used for spilling (for example through a pouring spout) the slag directly by means of controlled overturning: in other words, it can be convenient to generate a flow Q of slag with a section having a prevalent dimension in the transverse direction and a smaller dimension in the longitudinal direction. This enlarged conformation of the slag flow can favor the subsequent granulation step.

With respect to the means for generating a gas flow 20 for the insufflation of a gas flow 25 (preferably air), this can consist of one or more compressors or fans, for example of the centrifugal type, suitable for generating a jet of gas or mixture of gases 25 directed towards the flow Q of slag coming from the granulation container 150.

The gas can be air for example.

If the flow Q has the enlarged shape described above, the means 20 for generating the gas flow 25 can comprise an apparatus for distributing and dividing the flow-rate supplied by said one or more compressors or fans.

With respect now to the collection and transporting means 30, these are preferably composed of a conveyor of the vibrating or oscillating type, known for example for applications in the same field for the supply and loading step of the charge materials into the electric arc furnace such as for example ferrous scrap (Consteel® system).

The collection and transporting means 30 can possibly also be of other types, for example conveyors with metal plates, or "batch" transporting systems such as containers for the collection and handling of bulk materials: in general, all systems can be used which are suitable for handling solid materials at high temperatures, indicatively over 400° C.

The vibrating or oscillating conveyor, consisting of a rigid plate usually "U"- or "V"-shaped, or in general provided with lateral containment shoulders, offers the advantage of being easily cooled, for example by forced circulation of water or another fluid that laps against the lower side (opposite to that on which the transported material flows). For the application in question this is an advantageous aspect, as, after the cooling phase in air, the solidified slag granules require further cooling which can be facilitated if a conveyor equipped with a cooling system is provided.

Returning to the graph in FIG. 3, the cooling capacity of the collection and transporting system 30 affects the slope of the straight section of the curve $C_B$: in the presence of a suitable cooling circuit, in fact, the temperature of the granulate will tend to drop more rapidly compared to the case in which the collection and transporting system 30 is not cooled. Optionally, at least part of the thermal energy transferred from the granules to the conveyor and from the conveyor to the cooling fluid can be recovered.

To complete the collection and transporting system 30, if this is not produced with a rotating drum, as shown in the example of FIG. 8, a tunnel 350 can be provided for containing the volume that is crossed by the slag granules pushed by the jet of gas 25. The tunnel 350 is preferably cooled in order to facilitate the heat exchange of the slag granules by irradiation.

Also in this case, it is optionally possible to recover at least part of the thermal energy transferred to the fluid that cools the structure of the tunnel 350. Another advantage offered by the presence of the tunnel 350 is the reduction of noise levels; furthermore it allows the space in which the heat exchange of the granules takes place to be confined, also suitably treating the heated air, thus avoiding overheating the surrounding environment, creating potential problems of environmental comfort for the operators.

With respect to the deflection and/or stopping means 40 of said flow in drops/granules Q" of slag S configured so as to intercept said flow Q and cause the precipitation of the slag granules S in said collection and transporting system 30 for collecting and transporting the cooled slag granules, these can comprise one or more elements suitable for composing the obstacle against which the slag granules pushed by the gas jet 25 stop their course in the air, and then fall onto the conveyor 30.

Some alternative preferred embodiments have been described with reference to FIGS. 4, 4bis, 5, 5bis, 6 and 6 bis, 7 and 7 bis.

In addition to what has already been explained, it should be noted that if the containment tunnel 350 is present, the deflection and/or stopping means 40 of said flow in drops/granules Q" will have a shape and size comparable to the free section formed by the tunnel 350 and conveyor 30.

Figure 9:
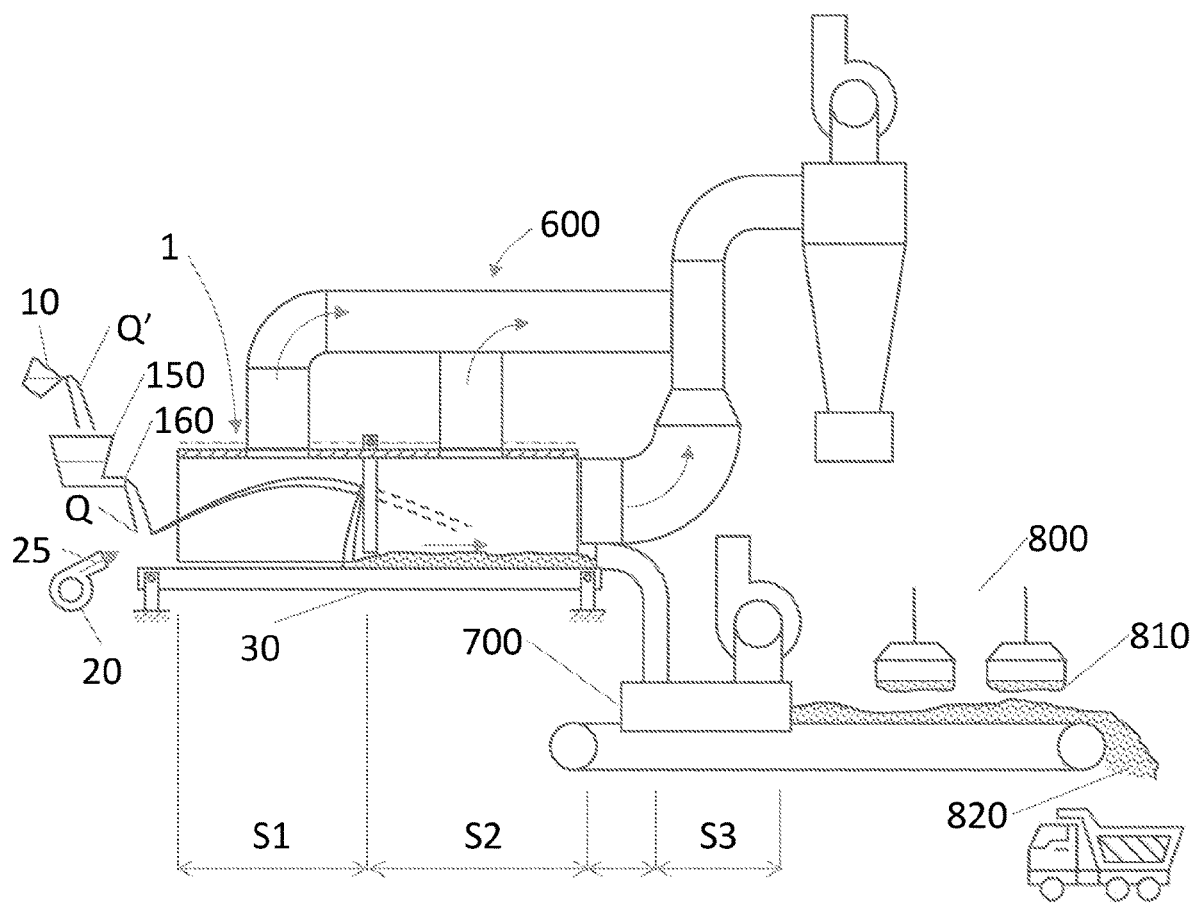
FIG. 9 shows a simplified schematic view of an apparatus according to the embodiment of FIG. 8 inserted in a possible slag treatment plant.

With reference to FIG. 9, additional elements not indispensable for the implementation of the present invention but useful for optimizing its implementation will now be illustrated, again by way of non-limiting example of the present invention: for the treatment of the air passing through the tunnel 350, a suction and filtering system 600 can be appropriately provided, which can be sized by the technician according to the characteristics of the plant. As shown in FIG. 9, the suction from the tunnel 350 can preferably take place in several points, in particular both upstream and downstream of said one or more deflection and/or stopping means 40 of the flow in drops/granules Q", as these actually constitute a considerable fluid-dynamic pressure drop for the air flow 25 which is passing through the tunnel 350.

Figure 10:
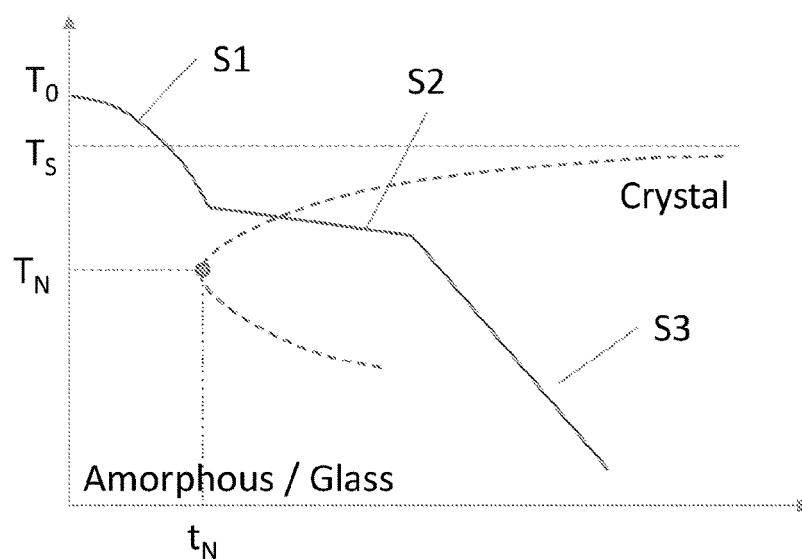
FIG. 10 shows a diagram showing the solid phases (crystalline and amorphous) that can be obtained according to the cooling rate of the slag (in a Cartesian plane in which the time is indicated on the abscissa and the temperature is indicated on the ordinate)

In some cases, depending on the size and constraints of the plant, it may be necessary to provide a third cooling step (after the first one consisting in the flight path in air, and the second consisting in cooling the granulate collected by the transporting system 30), to bring the granulate from the outlet temperature of the tunnel 350 up to a temperature suitable for the subsequent steps: the third cooling step can be carried out in a known manner in a special cooling apparatus 700 which can consist of a rotating drum system or with a fluidized bed, or by means of air jets or other systems known to those skilled in the art for cooling small-sized solid materials at medium temperatures. In this way, the temperature of the single slag particle can follow a trend similar to that shown in FIG. 10: in the first step S1 the cooling is rapid and takes place in air; subsequently, when the solidified particle reaches the conveyor 30, the cooling slows down as represented by the section S2; finally, the particle is subjected to a final, more rapid cooling, as represented by the section S3.

This cooling mode of the granules leaving the conveyor 30 may be necessary in particular when a predominantly crystalline structure of the granules is to be obtained: in this case, it will be necessary to have a short cooling section in air S1, followed by a slow cooling step S2 that is adequately prolonged (in order to allow adequate development of the crystalline phase), at the end of which the slag granules may still be at medium-high temperature, and therefore a third cooling step S3 in the appropriate apparatus 700 would be useful.

Finally, the last useful step for increasing the efficiency of the process and apparatus object of the present invention, arriving at the production of a pure slag granulate, consists in an iron-removal step, i.e. the removal of granules containing ferrous elements. This step can be carried out with a suitable known iron-removal plant 800, for example with the magnetic method. In this way the granules 820 of slag free from ferrous parts can be separated, which can be stored and then recycled in the final uses (e.g.: aggregates for civil applications, etc.), from the granules 810 containing iron in various forms (metallic, various oxides . . . ), which will be recycled within the same plant, for example by reintroducing them into the electric arc furnace.

It has thus been shown from the description provided so far how the process and apparatus for the dry granulation of slag according to the present invention achieve the undertaking and objectives proposed.

In particular, the advantages that can be obtained from the dry granulation process are evident, as also the dry granulation apparatus object of the present invention, in terms of control of the physical characteristics of the granulate obtained according to the intended uses.

The invention claimed is:

1. An apparatus for dry granulation of molten slag, comprising:
   a container containing the molten slag in liquid state to be treated;
   gas-flow generating means for generating a flow of gas suitable for enveloping a flow of the molten slag spilled from said container while said flow is emitted and before said molten slag comes into contact with other part or surfaces of the apparatus, breaking the flow of the molten slag into drops and pushing said drops along a trajectory having at least one component along a longitudinal direction directed away from said gas-flow generating means and from said container, thereby causing said drops to cool and turn into granules; and
   a collection and transporting system of the granules,
   further comprising means for deflecting and/or stopping said granules, said means for deflecting and/or stopping being configured to intercept said granules and cause a precipitation of said granules in said collection and transporting system, wherein said means for deflecting and/or stopping comprise a plate positioned along said longitudinal direction and oriented to cause a single contact point with said granules, and wherein said plate is movable along said longitudinal direction and can be blocked in a desired position, or wherein said container containing the molten slag in liquid state to be treated and said gas-flow generating means are mounted on a supporting structure, said structure being equipped with means which allow said structure to be moved at least along a direction parallel to a direction of the flow of the gas so as to vary a distance between said supporting structure and said means for deflecting and/or stopping said granules, said plate being fixed or movable.

2. The apparatus according to claim 1, wherein said plate comprises an impact surface configured for deflecting and/or stopping said granules.

3. The apparatus according to claim 2, wherein said plate can be rotated around a horizontal axis so as to modify an inclination of the impact surface with respect to a vertical direction and can be blocked in a desired position so as to modify a trajectory and a drop point of the granules deflected by said impact surface within the collection and transporting system.

4. The apparatus according to claim 1, wherein said means for deflecting and/or stopping said granules comprises a plurality of plates, each of said plates being movable, independently of each other, between a first non-operating position, in which said plurality do not intercept the granules, and an operating position, in which said plurality of plates intercept the granules.

5. The apparatus according to claim 1, wherein said collection and transporting system comprises a tunnel configured to contain a volume of the granules.

6. The apparatus according to claim 5, wherein said collection and transporting system comprises a conveyor.

7. The apparatus according to claim 6, wherein said conveyor and/or said tunnel are cooled.

8. An apparatus for dry granulation of molten slag, comprising:
a container containing the molten slag in liquid state to be treated;
gas-flow generating means for generating a flow of gas suitable for enveloping a flow of the molten slag spilled from said container while said flow is emitted and before said molten slag comes into contact with other part or surfaces of the apparatus, breaking the flow of the molten slag into drops and pushing said drops along a trajectory having at least one component along a longitudinal direction directed away from said gas-flow generating means and from said container, thereby causing said drops to cool and turn into granules; and
a collection and transporting system of the granules,
further comprising means for deflecting and/or stopping said granules, said means for deflecting and/or stopping being configured to intercept said granules and cause a precipitation of said granules in said collection and transporting system, controlling and modifying a cooling time and/or rate of said drops of said flow of said slag and obtaining the granules of the slag having desired morphological characteristics by modifying in-flight residence time of said drops pushed by said flow of gas,
wherein said collection and transporting system comprises a drum rotating around its longitudinal axis so as to transport granulate away from a granulation area of the slag underlying said means for deflecting and/or stopping said granules, which is supported and moved along the longitudinal direction by a movable supporting element configured to translate inside said drum relatively to the movable supporting element.

9. A dry granulation process of molten slag, comprising:
preparing a container containing the molten slag to be treated in liquid state;
overturning said container so as to spill the molten slag contained therein with a pre-established flow;
while the flow of molten slag is being spilled from said container and before the molten slag comes into contact with other part of an apparatus where the dry granulation process is being performed, hitting the flow of the molten slag with a jet of gas generated by gas-flow generating means, so as to break the flow of the molten slag into drops before said flow of the molten slag comes in contact with other parts or surfaces of the apparatus, and pushing said drops of said flow of the molten slag along a trajectory having at least one component along a longitudinal direction leading away from said gas-flow generating means and from said container, causing a cooling of said drops during a flight of said drops and a gradual solidification of the said drops into granules while said drops are in-flight;
causing said granules to have a single impact against a plate positioned along a flight path of said granules and to drop onto a collection and transporting system; and
collecting the granules of slag in said collection and transporting system,
further comprises a step of controlling and modifying a cooling time and/or a cooling rate of said drops or granules of said flow of the slag so as to obtain the granules having desired morphological characteristics by modifying an in-flight residence time of said drops or granules of said flow of said slag pushed by said jet of gas,
wherein modifying said in-flight residence time comprises moving one or both of said plate or said gas-flow generating means along said longitudinal direction.

10. The dry granulation process according to claim 9, wherein said plate intercepts said flow and causes a precipitation of said granules of said slag in a predetermined area of said collection and transporting system.

11. The dry granulation process according to claim 10, wherein said container containing the molten slag in the liquid state to be treated and said gas-flow generating means are mounted on a supporting structure, said supporting structure being equipped with means configured to move said supporting structure at least along a direction parallel to a direction of the gas flow so as to vary a distance between the supporting structure and said plate.

* * * * *